United States Patent
Chang et al.

(10) Patent No.: US 8,368,245 B2
(45) Date of Patent: Feb. 5, 2013

(54) OUT-DOOR UNIT WITH MULTIPLE PORTS

(75) Inventors: Kuo Tien Chang, Hsinchu (TW); Ju Yuan Chuang, Hsinchu (TW)

(73) Assignee: Microelectronics Technology, Inc., Hsinchu (TW)

( * ) Notice: Subject to any disclaimer, the term of this patent is extended or adjusted under 35 U.S.C. 154(b) by 311 days.

(21) Appl. No.: 12/826,905

(22) Filed: Jun. 30, 2010

(65) Prior Publication Data

US 2011/0043033 A1 Feb. 24, 2011

(30) Foreign Application Priority Data

Aug. 19, 2009 (TW) .............................. 98127803 A (51) Int. Cl.
*H02J 3/14* (2006.01)
(52) U.S. Cl. ............................................ 307/31; 307/45
(58) Field of Classification Search .................... 307/66, 307/31, 45; 455/130
See application file for complete search history.

(56) References Cited

U.S. PATENT DOCUMENTS

| 4,802,239 | A | * | 1/1989 | Ooto | 455/150.1 |
| 5,631,503 | A | * | 5/1997 | Cioffi | 307/66 |
| 7,395,037 | B2 | * | 7/2008 | Chen | 455/126 |
| 2007/0129010 | A1 | * | 6/2007 | Chen | 455/13.4 |

* cited by examiner

*Primary Examiner* — Daniel Cavallari
(74) *Attorney, Agent, or Firm* — WPAT, P.C.; Anthony King (57) ABSTRACT

An out-door unit with multiple ports comprises a circuit block, a DC-DC converter and a plurality of ports. The DC-DC converter is configured to provide a first current to the circuit block. The plurality of ports is connected to a plurality of in-door units respectively via a diode and provides a second current from the plurality of in-door units to the DC-DC converter via a diode respectively. The circuit block requires an operation current, and a first part of the operation current is the first current from the DC-DC converter and a second part of the operation current is the second current from one of the ports.

16 Claims, 8 Drawing Sheets

OUT-DOOR UNIT WITH MULTIPLE PORTS

BACKGROUND OF THE INVENTION

1. Field of the Invention

The present invention relates to an out-door unit, and more particularly, to an out-door unit with multiple ports.

2. Description of the Related Art

An out-door unit (ODU) is a wireless communication transceiver apparatus, such as a wireless communication transceiver apparatus applied to satellite communication, installed outdoors. A typical ODU applied to satellite communication comprises a low noise block (LNB) to process and convert a high frequency signal broadcasted by a satellite to an intermediate frequency signal for used by an in-door unit (IDU), such as a setup box, to receive a signal.

Figure 1:
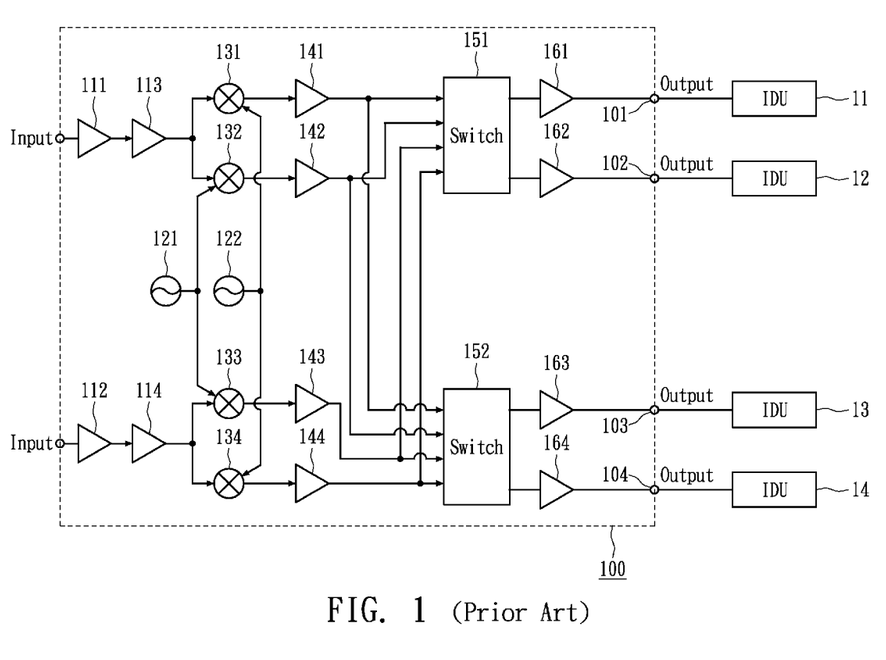
FIG. 1 shows a conventional ODU with multiple ports.

Power is supplied to an ODU by the IDUs to which it is connected with multiple ports. FIG. 1 shows a conventional ODU with multiple ports. As shown in FIG. 1, the ODU 100 is connected to a plurality of IDUs 11 to 14 and comprises a plurality of ports 101 to 104, a plurality of low noise amplifiers 111 to 114, a plurality of local oscillators 121 to 122, a plurality of mixers 131 to 134, a plurality of front-end intermediate frequency amplifiers 141 to 144, a plurality of switches 151 and 152 and a plurality of back-end intermediate frequency amplifiers 161 to 164. The plurality of low noise amplifiers 111 to 114 is configured to amplify received vertical and horizontal high-frequency satellite signals. The plurality of local oscillators 121 to 122 is configured to generate a plurality of intermediate frequency signals. The plurality of mixers 131 to 134 is configured to convert the received high-frequency satellite signals to a plurality intermediate frequency satellite signals by using the plurality of intermediate frequency signals. The plurality of front-end intermediate frequency amplifiers 141 to 144 is configured to amplify these intermediate frequency satellite signals and provide the amplified intermediate frequency satellite signals to the input terminals of the plurality of switches 151 and 152. The plurality of back-end intermediate frequency amplifiers 161 to 164 is configured to amplify the intermediate frequency satellite signals outputted by the plurality of switches 151 and 152 and provided to the plurality of IDUs 11 to 14 via the plurality of ports 101 to 104.

Figure 2:
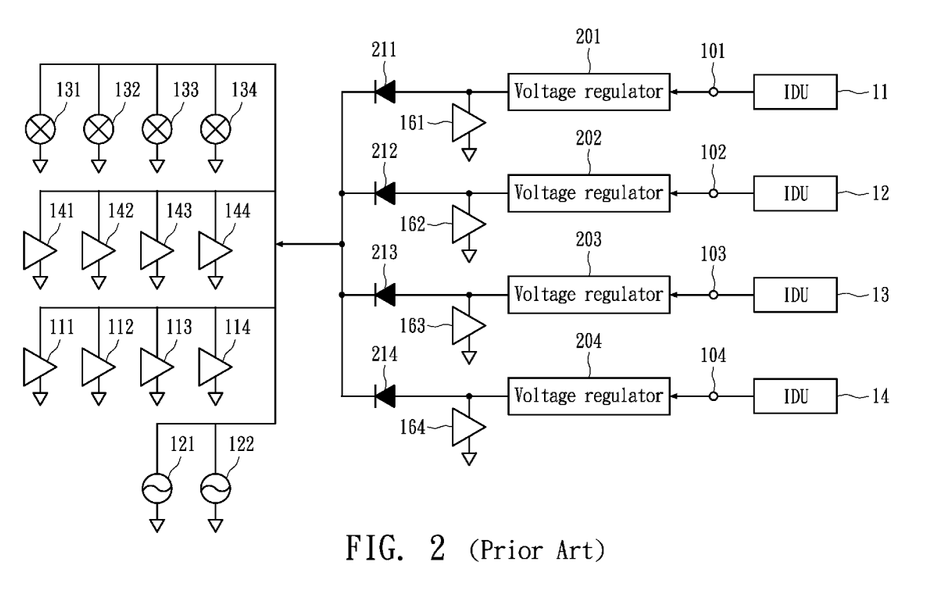
FIG. 2 shows a power supply network of a conventional ODU with multiple ports.

FIG. 2 shows a power supply network of the ODU with multiple ports shown in FIG. 1. The ODU 100 further comprises a plurality of voltage regulators 201 to 204 and a plurality of diodes 211 to 214. The plurality of voltage regulators 201 to 204 is configured to regulate the power provided by the plurality of IDUs 11 to 14 such that stable currents can be provided to the plurality of back-end intermediate frequency amplifiers. In addition, the plurality of voltage regulators 201 to 204 can provide stable currents via the plurality of diodes 211 to 214 to the plurality of low noise amplifiers 111 to 114, the plurality of local oscillators 121 to 122, the plurality of mixers 131 to 134, and the plurality of front-end intermediate frequency amplifiers 141 to 144 in a current-sharing configuration.

Figure 3:
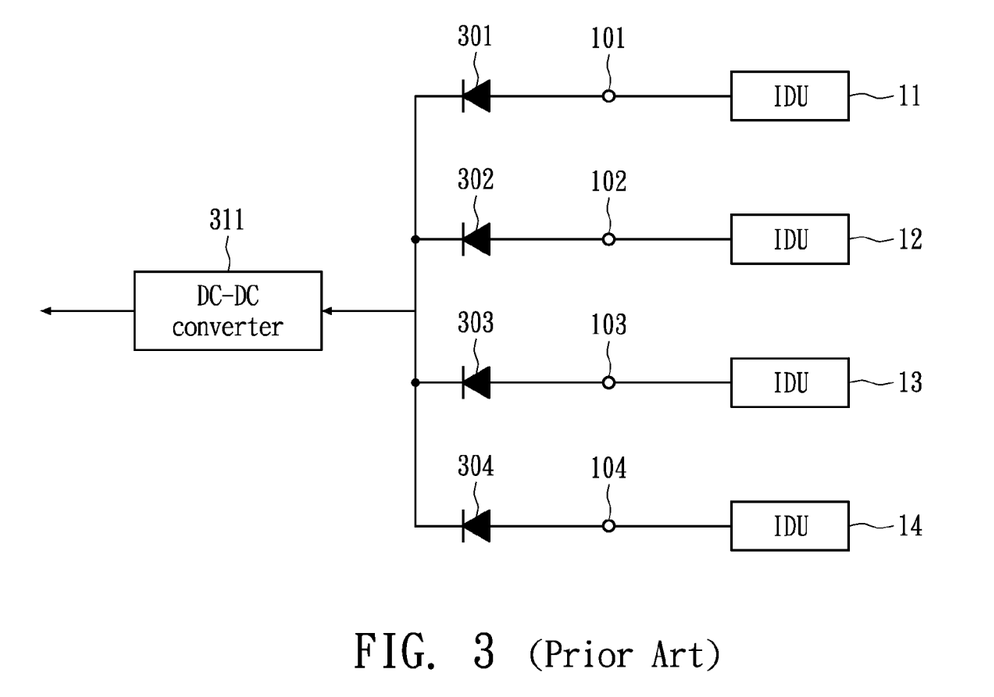
FIG. 3 shows a part of another power supply network of a conventional ODU with multiple ports.

However, the power supply network shown in FIG. 2 requires too much power to meet the requirements of the industry. To reduce power consumption, adjustments can be made to the power supply network shown in FIG. 2. FIG. 3 shows a part of another power supply network of the ODU with multiple ports shown in FIG. 1. As shown in FIG. 3, the ODU 100 further comprises a plurality of diodes 301 to 304. The plurality of voltage regulators 201 to 204 shown in FIG. 2 can be combined to become a DC-DC converter 311. The power provided by the plurality of IDUs 11 to 14 is sent to the DC-DC converter 311, which then provides power to other devices, via the plurality of diodes 301 to 304 in a current-sharing configuration. The DC-DC converter 311 replaces the plurality of voltage regulators 201 to 204 to reduce the output voltage and thus reduce the total power consumption.

However, many of the IDUs require minimum supply currents. When power is supplied in a current-sharing configuration, and the provided voltages of the plurality of IDUs are different, e.g. the provided voltage of the IDU 11 is different from that of the IDU 12, one of the IDUs does not provide current, which does not meet the requirements of the industry.

Figure 4:
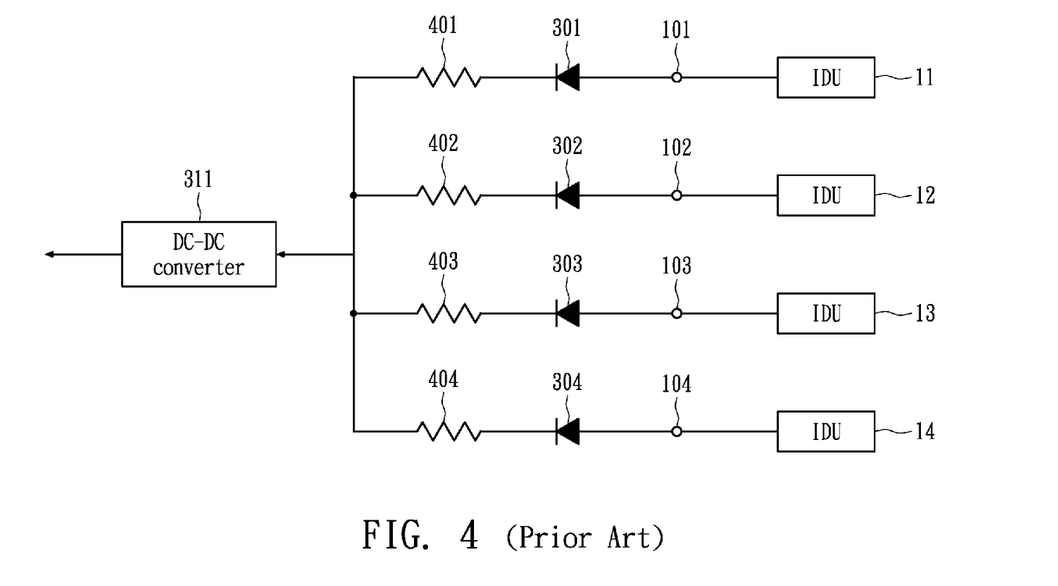
FIG. 4 shows a part of another power supply network of a conventional ODU with multiple ports.

To meet the minimum supply currents requirement, adjustments can be made to the power supply network shown in FIG. 3. FIG. 4 shows a part of another power supply network of the ODU with multiple ports shown in FIG. 1. As shown in FIG. 4, the ODU 100 further comprises a plurality of resistors 401 to 404. The plurality of resistors 401 to 404 are connected to the power providing paths of the plurality of IDUs 11 to 14 respectively such that the minimum supply current requirement of each of the plurality of IDUs 11 to 14 is met. However, the additional resistors 401 to 404 will increase the total power consumption.

Figure 5:
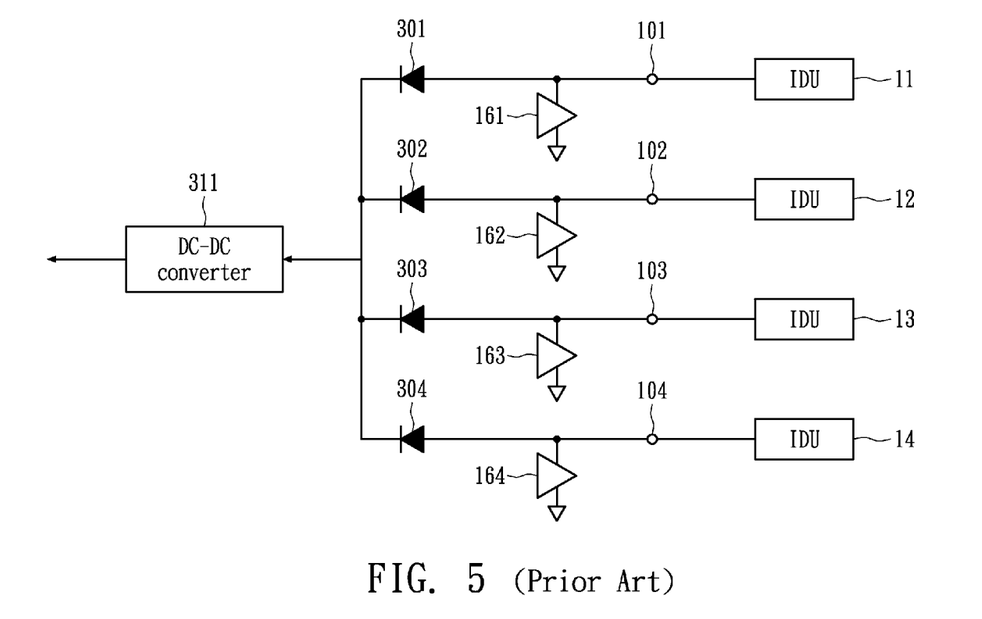
FIG. 5 shows a part of another power supply network of a conventional ODU with multiple ports.

FIG. 5 shows a part of another power supply network of the ODU with multiple ports shown in FIG. 1. As shown in FIG. 5, the plurality of back-end intermediate frequency amplifiers 161 to 164 are re-connected at the current supplying paths of the plurality of IDUs 11 to 14. Accordingly, the plurality of IDUs 11 to 14 provides the required current to the plurality of back-end intermediate frequency amplifiers to meet the minimum supply currents requirements. However, since the currents required by the plurality of back-end intermediate frequency amplifiers 161 to 164 are much higher than the minimum supply currents required by the plurality of IDUs 11 to 14, the total power consumption will increase.

In addition, each of the current supplying paths shown in FIGS. 4 and 5 can be serially connected with a DC-DC converter to reduce the current consumption of the plurality of resistors 401 to 404 and the plurality of back-end intermediate frequency amplifiers 161 to 164. However, the additional DC-DC converters will greatly increase the hardware costs.

Therefore, there is a need for an ODU with multiple ports, which can meet the minimum supply currents of IDUs and thus has the advantages of low power consumption and low hardware costs at the same time.

SUMMARY OF THE INVENTION

The ODU with multiple ports according to one embodiment of the present invention comprises a plurality of circuit blocks, a DC-DC converter and a plurality of ports. The DC-DC converter is configured to provide current to the plurality of circuit blocks. The plurality of ports is configured to be respectively connected to a plurality of in-door units and configured to respectively provide current from the plurality of in-door units to the DC-DC converter via a diode. At least one of the plurality of ports is connected to a first circuit block of the plurality of circuit blocks to provide current to the first circuit block.

The ODU with multiple ports according to another embodiment of the present invention comprises a plurality of circuit blocks, a DC-DC converter and a plurality of ports. The DC-DC converter is configured to provide current to the plurality of circuit blocks in a current-sharing configuration. The plurality of ports are configured to be respectively connected to a plurality of in-door units and configured to provide current from the plurality of in-door units to the DC-DC converter in a current-sharing configuration. At least two of the plurality of ports is connected to a first circuit block of the plurality of circuit blocks to provide current to the first circuit block in a current-sharing configuration.

BRIEF DESCRIPTION OF THE DRAWINGS

The objectives and advantages of the present invention will become apparent upon reading the following description and upon referring to the accompanying drawings of which.

DETAILED DESCRIPTION OF THE INVENTION

Figure 6:
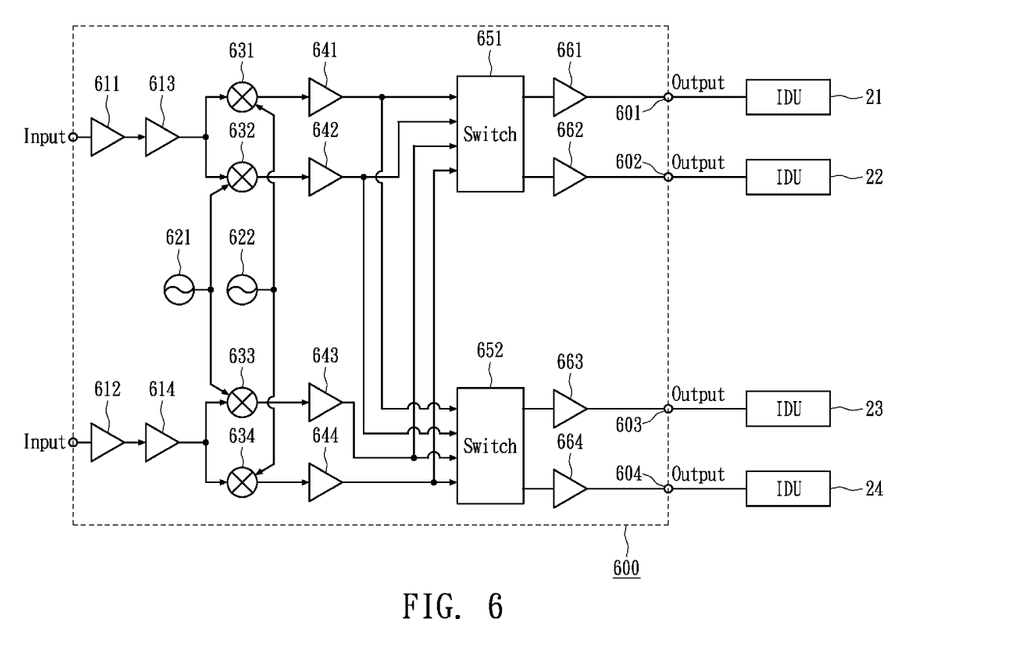
FIG. 6 shows a schematic view of an ODU with multiple ports according to an embodiment of the present invention.

FIG. 6 shows a schematic view of an ODU with multiple ports according to an embodiment of the present invention. The ODU 600 is applied to satellite communication. As shown in FIG. 6, the ODU 600 comprises an LNB and is connected to a plurality of IDUs 21 to 24, wherein the plurality of IDUs is setup box devices. The ODU 600 comprises a plurality of ports 601 to 604, a plurality of low noise amplifiers 611 to 614, a plurality of local oscillators 621 to 622, a plurality of mixers 631 to 634, a plurality of front-end intermediate frequency amplifiers 641 to 644, a plurality of switches 651 and 652 and a plurality of back-end intermediate frequency amplifiers 661 to 664. The plurality of low noise amplifiers 611 to 614 are configured to amplify received vertical and horizontal high-frequency satellite signals. The plurality of local oscillators 621 to 622 is configured to generate a plurality of intermediate frequency signals. The plurality of mixers 631 to 634 are configured to convert the received high-frequency satellite signals to a plurality intermediate frequency satellite signals by using the plurality of intermediate frequency signals. The plurality of front-end intermediate frequency amplifiers 641 to 644 are configured to amplify these intermediate frequency satellite signals and provide the amplified intermediate frequency satellite signals to the input terminals of the plurality of switches 651 and 652. The plurality of back-end intermediate frequency amplifiers 661 to 664 are configured to amplify the intermediate frequency satellite signals outputted by the plurality of switches 651 and 652 provided to the plurality of IDUs 21 to 24 via the plurality of ports 601 to 604.

Figure 7:
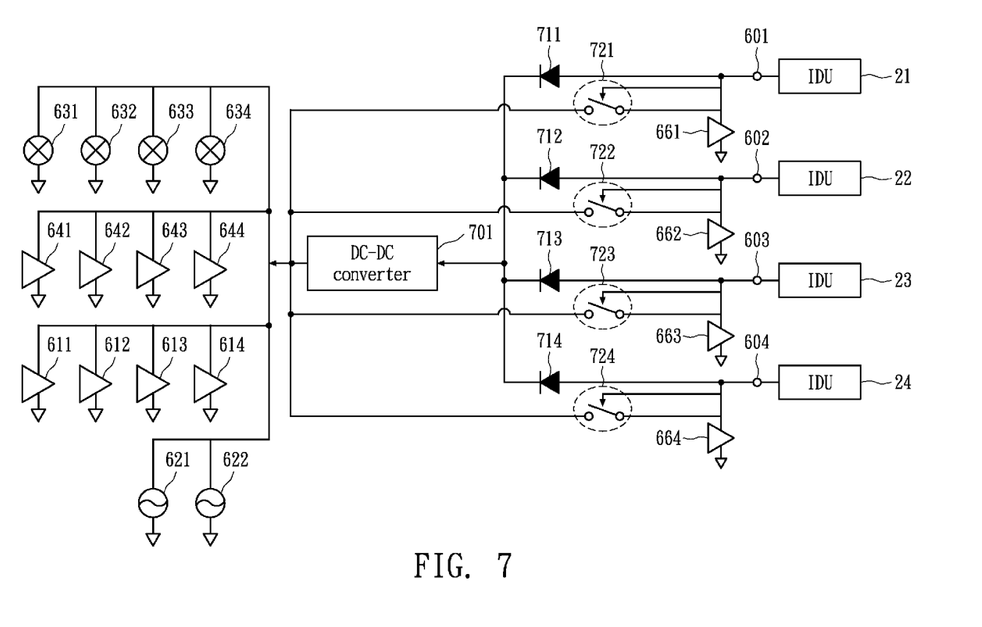
FIG. 7 shows a power supply network of an ODU with multiple ports according to an embodiment of the present invention.

FIG. 7 shows a power supply network of the ODU with multiple ports shown in FIG. 6. As shown in FIG. 7, the ODU 600 further comprises a DC-DC converter 701 and a plurality of diodes 711 to 714 and uses the DC-DC converter 701 to provide power in a current-sharing configuration. The DC-DC converter 701 is configured to convert the power provided by the plurality of IDUs 21 to 24 to provide stable currents to the low noise amplifiers 611 to 614, the plurality of local oscillators 621 to 622, the plurality of mixers 631 to 634, the plurality of front-end intermediate frequency amplifiers 641 to 644 and the plurality of back-end intermediate frequency amplifiers 661 to 664.

As shown in FIG. 7, the plurality of back-end intermediate frequency amplifiers 661 to 664 are also connected to the plurality of ports 601 to 604 such that the plurality of IDUs 21 to 24 can provide power to the plurality of back-end intermediate frequency amplifiers 661 to 664. For the plurality of back-end intermediate frequency amplifiers 661 to 664, e.g. the back-end intermediate frequency amplifier 661, the required current is provided by the DC-DC converter 701 and the IDU 21. Accordingly, the IDU 21 only provides a part of the current required by the back-end intermediate frequency amplifier 661 to meet its minimum supply current requirement. The other part of the current required by the back-end intermediate frequency amplifier 661 is provided by the DC-DC converter 701. In other words, the ODU 600 provides the minimum supply currents of the plurality of IDUs 21 to 24 to the plurality of back-end intermediate frequency amplifiers 661 to 664 without significantly increasing the supply currents of the plurality of IDUs 21 to 24. Therefore, the minimum supply currents to the IDUs and low power consumption can be achieved at the same time. In addition, the ODU 600 uses only one DC-DC converter 701 and thus reduces the hardware costs.

Preferably, a plurality of switches 721 to 724 are deployed at each of the current supplying paths of the plurality of back-end intermediate frequency amplifiers 661 to 664, respectively. The plurality of switches 721 to 724 are configured to stop the DC-DC converter 701 from providing current to the plurality of back-end intermediate frequency amplifiers 661 to 664 when the plurality of ports 601 to 604 are not connected to the plurality of IDUs 21 to 24.

The plurality of ports 601 to 604 are not limited to be connected to the plurality of back-end intermediate frequency amplifiers 661 to 664, but can also connected to other circuit blocks, including function blocks used for signal processing, and can be implemented by circuit devices or integrated circuits, such as the plurality of low noise amplifiers 611 to 614, the plurality of local oscillators 621 to 622, the plurality of mixers 631 to 634 or the plurality of front-end intermediate frequency amplifiers 641 to 644, to meet the minimum supply current requirements.

Figure 8:
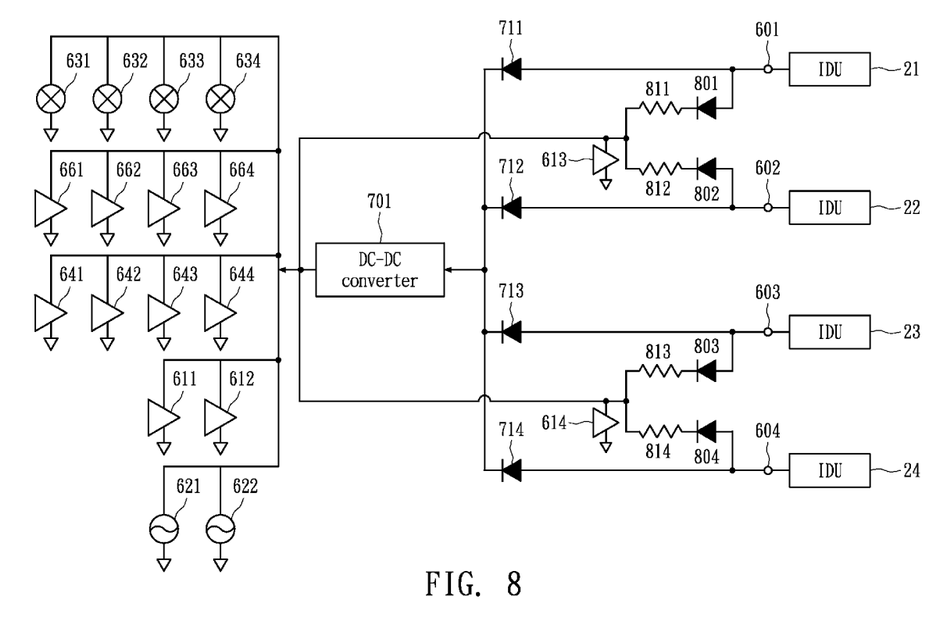
FIG. 8 shows a power supply network of an ODU with multiple ports according to another embodiment of the present invention.

FIG. 8 shows another power supply network of the ODU with multiple ports shown in FIG. 6. As shown in FIG. 8, the ODU 600 further comprises a plurality of diodes 801 to 804 and a plurality of resistors 811 to 814. The plurality of ports 601 to 604 are connected to the plurality of low noise amplifiers 613 and 614. Since the number of the plurality of low noise amplifiers 613 and 614 is half of that of the plurality of ports 601 to 604, the plurality of ports 601 to 604 are connected to the plurality of low noise amplifiers 613 and 614 in a current-sharing configuration. Accordingly, the plurality of ports 601 and 602 are connected to the low noise amplifiers 613 via the plurality of diodes 801 and 802 and the plurality of resistors 811 and 812. The plurality of ports 603 and 604 are connected to the low noise amplifiers 614 via the plurality of diodes 803 and 804 and the plurality of resistors 813 and 814. The plurality of IDUs 21 to 24 provide a portion of the currents required by the plurality of low noise amplifiers 613 and 614 to meet their minimum supply current requirements.

Compared with the power supply network of a conventional ODU with multiple ports, under the same circumstances, the ODUs with multiple ports according to the embodiments of the present invention can meet the minimum supply current requirements of IDUs and have the advantages of low power consumption and low hardware costs at the same time. Compared to the power supply network shown in FIG. 4, the power supply network shown in FIG. 7 can reduce current consumption by about 29.9%. Such current consumption reduction can meet the requirements of the industry. Further, the ODUs with multiple ports according to the embodiments of the present invention are not limited to four ports, but can have any other number of ports.

In conclusion, the ODUs with multiple ports according to the embodiments of the present invention use their ports to provide a portion of the circuit blocks a portion of their required currents such that the minimum supply current requirements can be satisfied. In addition, as mentioned above, the ODUs with multiple ports according to the embodiments of the present invention have the advantages of low power consumption and low hardware costs, and thus can be easily applied by the industry.

The above-described embodiments of the present invention are intended to be illustrative only. Those skilled in the art may devise numerous alternative embodiments without departing from the scope of the following claims.

What is claimed is:

1. An out-door unit with multiple ports, comprising:
   at least one circuit block;
   a DC-DC converter, configured to provide a first current to the circuit block; and
   a plurality of ports, configured to be respectively connected to a plurality of in-door units and configured to respectively provide a second current from the plurality of in-door units to the DC-DC converter via a diode;
   wherein the circuit block requires an operation current, and a first part of the operation current is the first current from the DC-DC converter and a second part of the operation current is the second current from one of the ports.

2. The out-door unit of claim 1, further comprising a low noise block.

3. The out-door unit of claim 1, comprising a plurality of circuit blocks selected from the group consisting of a plurality of low noise amplifiers, a plurality of local oscillators, a plurality of mixers and a plurality of intermediate frequency amplifiers.

4. The out-door unit of claim 3, wherein the circuit block is a low noise amplifier, a local oscillator, a mixer or an intermediate frequency amplifier.

5. The out-door unit of claim 1, wherein the circuit block is connected to only one of the plurality of ports.

6. The out-door unit of claim 5, wherein the circuit block is connected to only one of the plurality of ports via a resistor.

7. The out-door unit of claim 5, wherein the circuit block is connected to only one of the plurality of ports via a diode.

8. The out-door unit of claim 5, wherein the circuit block is connected to the DC-DC converter via a switch such that the DC-DC converter stops providing the first current to the circuit block when the port connected by the circuit block is not connected to an in-door unit.

9. The out-door unit of claim 1, wherein the circuit block is connected to more than one of the plurality of ports.

10. The out-door unit of claim 9, wherein the circuit block is connected to each of the more than one of the plurality of ports via a resistor.

11. The out-door unit of claim 9, wherein the circuit block is connected to each of the more than one of the plurality of ports via a diode.

12. The out-door unit of claim 1, which is used for satellite communication.

13. The out-door unit of claim 1, wherein the plurality of in-door units are setup box devices.

14. The out-door unit of claim 1, wherein the plurality of ports includes a first port and a second port, the circuit block is connected to the first port and the second port, and the second part of the operation current is the second current from the first port, and a third part of the operation current is the second current from the third port.

15. The out-door unit of claim 14, wherein the circuit block is connected to the first port and the second port in a current-sharing configuration.

16. The out-door unit of claim 1, comprising a plurality of circuit blocks connected to the DC-DC converter in a current-sharing configuration.

* * * * *